UNITED STATES PATENT OFFICE.

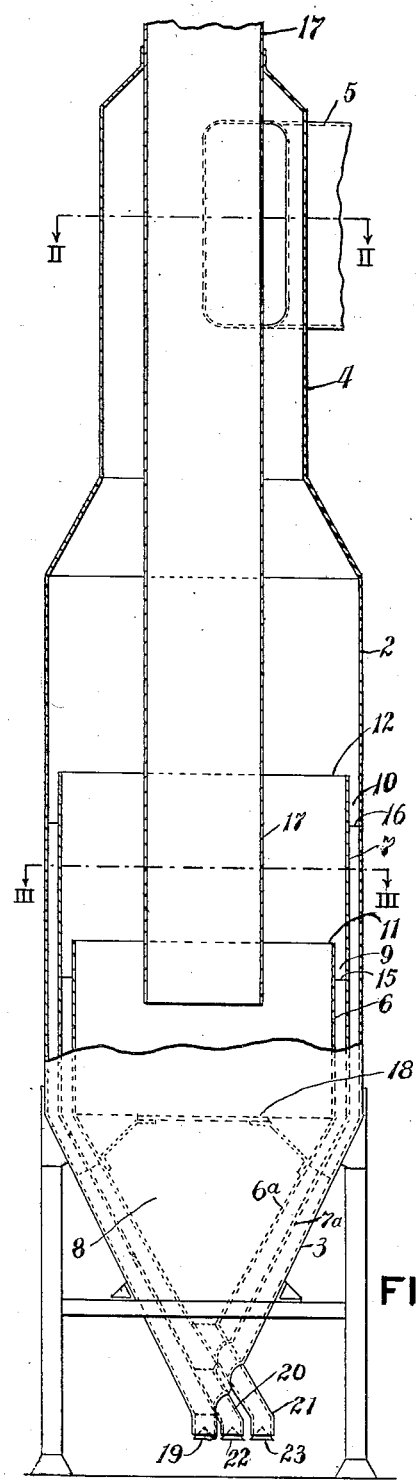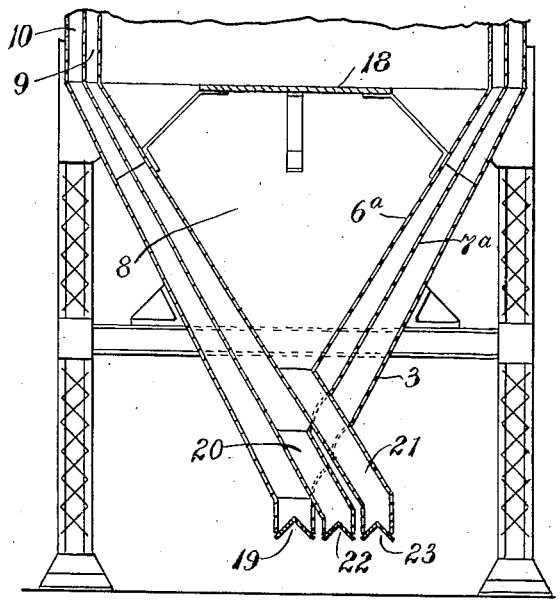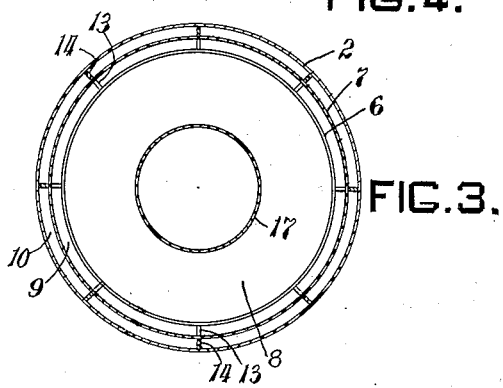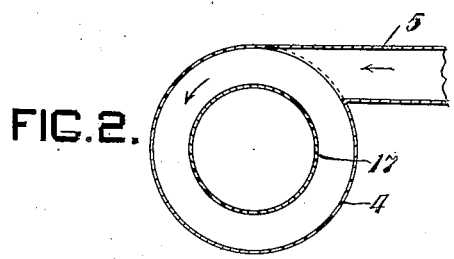

GEORGE W. HEWITT, OF WHEELING, WEST VIRGINIA, AND ALFRED STEINBART, OF PITTSBURGH, PENNSYLVANIA.

APPARATUS FOR CLEANING GASES.

1,344,585.     Specification of Letters Patent.     Patented June 22, 1920.

Application filed September 8, 1919. Serial No. 322,552.

*To all whom it may concern:*

Be it known that we, GEORGE W. HEWITT and ALFRED STEINBART, both citizens of the United States, and residents, respectively, of Wheeling, in the county of Ohio and State of West Virginia, and Pittsburgh, in the county of Allegheny and State of Pennsylvania, have invented certain new and useful Improvements in Apparatus for Cleaning Gases, of which the following is a specification.

Our invention relates to cleaning gases containing impurities in the form of finely divided solids or liquids and, while not limited to such gases, more particularly relates to blast furnace gases containing considerable quantities of finely divided solids carried therein in suspension.

One object of the invention is to provide gas cleaning apparatus having improved means whereby the finely divided impurities in the gases are separated from the body of gases and are segregated therefrom in a rapid, effective, and economical manner.

Another object of our invention is the provision of gas cleaning apparatus having improved means wherein the impurities are separated and removed from the gases and whereby reëntrance of the separated impurities into the column of cleaned gases is overcome and prevented.

Another object of this invention is the provision in gas cleaning apparatus of novel means whereby a rapid whirling motion is imparted to the traveling column of gases in being cleaned, and the whirling column of gases thereby separated into a central core of substantially clean gases and surrounding annular layer or layers of impurity laden gases.

A further object of our invention is the provision of gas cleaning apparatus having improved means whereby the impurities are segregated from the cleaned gases before change or interruption in the direction of travel of the tangentially moving annulus of impurity laden gases, and whereby whirling motion of the annulus of impurity laden gases is retarded and stopped after being separated from the central core of clean gases and prior to the deposition of the impurities in the impurity laden gases.

Another object of our invention is the provision of gas cleaning apparatus having novel means whereby separately collected accumulations of the impurities in the gases are prevented from being brought together or returned to the gases from which they have been taken and are removed separately and independently from the cleaning apparatus.

A still further object of the invention is the provision of gas cleaning apparatus having the novel constructions, arrangements, and combination of parts shown in the drawings, to be described in detail hereinafter, and to be particularly pointed out in the appended claims.

Referring to the drawings forming part of this specification, Figure 1 is a sectional elevation showing one arrangement of gas cleaning apparatus constructed and arranged in accordance with our invention.

Fig. 2 is a sectional plan on the line II—II of Fig. 1, showing a preferred arrangement of the gas inlet to the gas cleaning apparatus.

Fig. 3 is a sectional plan on the line III—III of Fig. 1.

Fig. 4 is a sectional elevation, on an enlarged scale, showing the construction and arrangement of the lower end of the cleaning chamber of the apparatus.

In the accompanying drawings, the numeral 2 designates the outer metal shell of the gas cleaning apparatus, this shell having a frusto-conical lower end 3, and an upper end 4 of reduced diameter. The upper end 4 of the shell preferably is provided with a tangentially arranged inlet 5, which imparts a rapid swirling movement to the gases entering the upper end 4 of the gas cleaning apparatus. This whirling movement causes the impurities to be thrown outwardly by centrifugal force so as to separate the incoming gases into an annular outer ring of impurity laden gases and central body of substantially clean gases. The lower portion of the shell 2 is provided with partitions 6 and 7 having cylindrical upper portions and frusto-conical lower portions $6^a$, $7^a$. The partitions, which lie within the shell 3, divide the lower or dust collecting portion of the cleaning chamber into an inner chamber 8, and a plurality of concentric outer chambers 9 and 10. The upper edges 11 and 12 of the cylindrical partitions 6 and 7 terminate at different points in the height of the cleaning chamber; and these partitions are connected to each other, and to the outer shell, by a series of radial partitions 13 and 14. As is clearly shown in Fig. 1, the upper edge 15 of each of the partitions 13 terminates below the upper edge 11 of the inwardly lying cylindrical partition 6 which forms the annular chamber 9 in which the radial partitions are set, and the upper edge 16 of the radial partitions 14 in the chamber 10 terminate below the upper edge 12 of the cylindrical partition 7. The lower end of the radial partitions 13, 14 terminate some distance above the lower end of the frusto-conical lower ends 6ª, 7ª of the cylindrical partitions 6 and 7.

It also will be seen by reference to Figs. 1 and 4 that the frusto-conical lower ends 6ª, 7ª of the partitions 6 and 7 while concentric are not parallel lengthwise with one another or with the lower end 3 of the outer shell, this construction affording increased storage space for impurities in the lower end of the chambers 9 and 10.

Eight radial partitions are shown in each chamber 9 and 10, but, obviously, this number may be varied, as found necessary, with changes in the diameter of the cleaning apparatus.

A cylindrical outlet flue 17 for the clean gases extends vertically downward within the outer shell to a point some distance below the upper edge 11 of the innermost cylindrical partition 6, and a horizontal deflector or baffle 18 is provided in the innermost chamber 8 a short distance below the lower intake end of the cylindrical gas outlet 17.

The frusto-conical portion 3 of shell 2 is provided at its lower end with a cleaning outlet through which accumulations of impurities are removed by gravity from time to time. A movable bell 19, of old and well known construction, is used to normally close this outlet. The lower end of the frusto-conical portions 6ª, 7ª of the partitions 6 and 7 open into one end of the pipes 21, 20, and these pipes which project through the shell 3 are closed at their lower ends by bells 23 and 22 operatively arranged in the same way as the bell 19. It will be noted that the collections of impurities are removed separately and independently from each collecting chamber and without communication between the chambers during the removal of the impurities.

There is no communication whatever between chambers 8, 9, and 10 at the bottom. This feature is absolutely necessary to effect cleaning of the gases. If there were communication between these chambers at the bottom there would be a strong current of gases passing down in chambers 9 and 10 into the bottom of chamber 8. The gas current would carry away, up through chamber 8, all the dust collected in all three chambers. The reason this current is set up is that in a gas in whirling motion, there is always a higher pressure at the circumference than at the center of the whirl. The pressure gradually decreases from the circumference to the center; as the compartment 10 is at the circumference of the whirl, compartment 9 more to the center, and compartment 8 under the center, a strong flow of gases would set up through these compartments were they connected at the bottom.

In the operation of our improved gas cleaning apparatus, the gases enter the upper end 4 of the outer shell 2 through the tangential inlet 5. This tangential inlet imparts a rapid swirling motion to the entering gases, which pass downwardly into the enlarged intermediate section 2 of the cleaning chamber. In traveling through this portion of the cleaning chamber, the finely divided solids or impurities will be thrown outwardly by centrifugal force, and the impurities caused to segregate in an annular ring at the surface of the outer shell 2 and form an annular outer layer of gases densely laden with impurities and an inner layer of substantially clean gases. It also is found that the heaviest articles of the impurities will be next to the surface of the shell 2 and that the impurities are of gradually lessened size and weight toward the inner margin of the impurity laden layer of gases. The impurities in the whirling heavily laden outer layer of the gases will gradually pass downwardly by gravity, and upon coming into contact with the vertically arranged radial partitions 13, 14 in the annular chambers 9 and 10, will cease to rotate and will fall vertically in the pockets in the lower end of the chambers 9 and 10. The major portion of the impurities will pass downwardly into the annular chamber 10 and most of the balance into the chamber 9 while a relatively smaller amount will collect in the bottom of the innermost chamber 8.

The central layer of clean gases, which contains but a small percentage of impurities, will pass downwardly into the cylindrical inner chamber and then pass upwardly and outwardly through the central cylindrical outlet 17. The change in the direction of flow of the gases upon entering the lower end of the outlet 17 will remove any impurities remaining in this central layer of gases, and these precipitated impurities will collect below the deflector 18 in the lower portion of the central dust collecting chamber 8. The deflector 18 acts to prevent the outgoing stream of gases from picking up impurities already collected in the bottom of the central chamber 8. The bells 19, 22 and 23, which are mounted in the usual manner, will be lowered from time to time so as to separately and independently withdraw the impurities collected in the bottom of the dust collecting chambers 10, 9, and 8.

The advantages of our invention which will be appreciated by those skilled in the art, arise from the peculiar combination and arrangement of parts whereby the gases are effectively cleaned and the impurities removed are prevented from coming into contact with or being picked up by the stream of clean gases.

Many modifications in the construction and arrangement of the parts of the apparatus may be made without departing from our invention as defined in the appended claims.

We claim:—

1. Apparatus for cleaning gases, comprising a lengthwise vertical cylindrical gas cleaning chamber, a plurality of imperforate cylindrical partitions within said cleaning chamber forming a plurality of collecting compartments therein for the centrifugally separated impurities, said compartments having bottom ends closed against communication one with another, and a gas main opening tangentially into the upper end of said gas cleaning chamber, arranged to impart a whirling motion to the incoming gases, a gas discharge main at the upper end of said cleaning chamber having a depending inlet end extending downwardly within the cleaning chamber to below the upper edge of the inner cylindrical partition in said cleaning chamber, a gravity discharge outlet on the lower end of said cleaning chamber and means for closing said discharge outlet.

2. Apparatus for cleaning gases, comprising a lengthwise vertical cylindrical gas cleaning chamber, cylindrical partitions within said cleaning chamber forming a plurality of separate impurity collecting compartments therein, said compartments having lower ends thereof closed against communication with one another, said compartments being of varying heights, radial partitions forming said compartments into sectors within said compartments, a gas supply main opening tangentially into the upper end of said gas cleaning chamber and arranged to impart a swirling motion to the gases entering the cleaning chamber, a gas discharge main at the upper end of said cleaning chamber having a depending inlet end extending downwardly within the innermost cleaning chamber to an appreciable distance below the upper edge of the inner cylindrical partition in said cleaning chamber, a gravity discharge outlet on the lower end of said cleaning chamber, and means for closing said discharge outlet.

3. Apparatus for cleaning gases, comprising a lengthwise vertical cylindrical gas cleaning chamber, cylindrical partitions within said cleaning chamber forming a plurality of impurity collecting compartments therein, said compartments having open tops and closed bottoms and being of varying heights, radial partitions within said compartments, said partitions terminating below the upper edge of the cylindrical partition forming the inner side of the compartments, a gas supply main opening tangentially into the upper end of said gas cleaning chamber and arranged to impart a swirling motion to the gases entering the cleaning chamber, a gas discharge main at the upper end of said cleaning chamber having a depending inlet end extending downwardly within the cleaning chamber to an appreciable distance below the upper edge of the inner cylindrical partition in said cleaning chamber, a gravity discharge outlet on the lower end of said cleaning chamber, and means for closing said discharge outlet.

4. Apparatus for cleaning gases, comprising a lengthwise vertical cylindrical gas cleaning chamber, cylindrical partitions within said cleaning chamber forming a plurality of separation compartments therein, said compartments having upper ends opening into said gas cleaning chamber and bottom ends normally closed relative to one another, said cylindrical partitions extending upwardly to varying heights within said cleaning chamber, radial partitions extending upwardly and terminating below the upper end of the inner cylindrical partition to which each is connected, a gas supply main opening tangentially into the upper end of said gas cleaning chamber, a gas discharge main at the upper end of said cleaning chamber having a depending inlet end extending downwardly within the cleaning chamber to below the upper edge of the inner cylindrical partition in said cleaning chamber, a gravity discharge outlet on the lower end of said cleaning chamber, and means for closing said discharge outlet.

5. Apparatus for cleaning gases, comprising a lengthwise vertical imperforate cylindrical gas cleaning chamber, cylindrical partitions within said cleaning chamber forming a plurality of impurity collecting compartments therein having normally closed bottom ends, said cylindrical partitions extending upwardly to varying levels in said cleaning chamber, a gas supply main opening tangentially into the upper end of said gas cleaning chamber, a gas discharge main at the upper end of said cleaning chamber having a depending inlet end extending downwardly within the cleaning chamber to below the upper edge of the inner cylindrical partition in said cleaning chamber, a gravity discharge outlet on the lower end of each cleaning compartment, and means for opening and closing said outlets.

6. Apparatus for cleaning gases, comprising a lengthwise vertical imperforate cylindrical gas cleaning chamber, cylindrical partitions within said cleaning chamber forming a plurality of impurity collecting compartments therein, said compartments having bottom ends normally closed against communication with one another and with the atmosphere, said cylindrical partitions extending upwardly to varying levels in said cleaning chamber, a gas supply main opening tangentially into the upper end of said gas cleaning chamber, a gas discharge main at the upper end of said cleaning chamber having a depending inlet end extending downwardly within the cleaning chamber to below the upper edge of the inner cylindrical partitions in said cleaning chamber, a gravity discharge outlet on the lower end of each cleaning compartment, and separate and independently operable means for closing each of said outlets.

7. Apparatus for cleaning gases, comprising a lengthwise vertical cylindrical gas cleaning chamber, cylindrical partitions within said cleaning chamber, forming a plurality of dust collecting compartments therein, said compartments having bottoms normally closed against communication with one another and with the atmosphere, said cylindrical partitions extending upwardly to varying levels in said cleaning chamber, means to overcome rotation of the gases within the dust collecting compartments, a gas supply main opening tangentially into the upper end of said gas cleaning chamber, a gas discharge main at the upper end of said cleaning chamber having a depending inlet and extending downwardly within the cleaning chamber to below the upper edge of the inner cylindrical partitions in said cleaning chamber, a discharge outlet on the lower end of each cleaning compartment, and means for closing each of the said outlets.

8. Apparatus for cleaning gases, comprising a lengthwise vertical cylindrical gas cleaning chamber, cylindrical partitions within said cleaning chamber forming a plurality of impurity collecting compartments therein, said cylindrical partitions extending upwardly to varying levels in said cleaning chamber, a gas supply main opening tangentially into the upper end of said gas cleaning chamber, a gas discharge main at the upper end of said cleaning chamber having a depending inlet end extending downwardly within the cleaning chamber to below the upper edge of the inner cylindrical partition in said cleaning chamber, a gravity discharge outlet on the lower end of said cleaning chamber, and means for closing said discharge outlet.

In witness whereof we have hereunto signed our names.

GEORGE W. HEWITT.
ALFRED STEINBART.